United States Patent [19]

Heule

[11] Patent Number: 4,756,649

[45] Date of Patent: Jul. 12, 1988

[54] COUNTERBORE FOR THE BILATERAL ATTACHMENT OF PLANE SURFACES TO BOLT HOLES

[76] Inventor: Heinrich Heule, Kristallstrasse 6, 9436 Balgach, Switzerland

[21] Appl. No.: 8,235

[22] Filed: Jan. 29, 1987

[30] Foreign Application Priority Data

Jan. 29, 1986 [DE] Fed. Rep. of Germany ........ 3602667

[51] Int. Cl.$^4$ ............................................. B23B 51/00
[52] U.S. Cl. .................................... 408/178; 408/147; 408/157
[58] Field of Search .............. 408/153, 178, 157, 173, 408/174, 158, 161, 147, 146

[56] References Cited

U.S. PATENT DOCUMENTS

| | | | |
|---|---|---|---|
| 2,003,402 | 6/1935 | Thomas | 408/157 |
| 3,738,767 | 6/1973 | Benjamin et al. | 408/161 |
| 4,039,295 | 8/1977 | Hockmuth | 408/186 |
| 4,140,432 | 2/1979 | Heule | 408/157 |
| 4,242,018 | 12/1980 | Schurfeld | 408/157 |
| 4,278,372 | 7/1981 | Heisner | 408/157 |

FOREIGN PATENT DOCUMENTS 7608207 1/1977 Netherlands ........................ 408/153

Primary Examiner—Gil Weidenfeld
Assistant Examiner—Daniel W. Howell
Attorney, Agent, or Firm—Fleit, Jacobson, Cohn & Price

[57] ABSTRACT

A counterbore for the bilateral mounting of plane surfaces on through holes that consists of a tool head that may be driven rotationally by means of a shank. The counterbore has two cutting heads with cutting edges pointing in opposite directions. The cutting heads are guided within the tool head in take-up slots in such a way that they may be moved out radially and fixed in a preselected position. The cutting heads lie against one another within the area of the take-up slots. In order that high cutting forces may be transmitted easily in a tool head of small dimensions, the cutting heads are guided through a guide slot extending in a radial direction and positioned in the take-up slots of the tool head.

9 Claims, 3 Drawing Sheets

COUNTERBORE FOR THE BILATERAL ATTACHMENT OF PLANE SURFACES TO BOLT HOLES

The invention is concerned with a counterbore.

BACKGROUND OF THE INVENTION

A known counterbore is described in DE No. 33 21 111 A1 or EP No. 129 116 A2. Reference is made to the disclosure contents of these two documents, inasmuch as the prior disclosures will be useful in understanding the present invention.

The characteristic of the known counterbore referred to above is the fact that the die heads or cutters comprise cutting edges that face in opposite directions, and are guided in receiving (take-up) slots in the cutter head, in such a way that they may be fixed in a set position and also moved or adjusted. The profile or cross section of the receiving slots is rectangular and penetrates, window-like, the external circumference of the cutting head, that is, constitutes a through bore on a diameter.

SUMMARY OF THE INVENTION

Tests have shown that the die heads are able to resist higher cutting pressures when a separate guide-way has been provided for the die head in the receiving slots of the tool head. Consequently, the invention provides a solution to the problem of further developing a counterbore of the type previously mentioned, in such a way that the die heads will be able to resist increased cutting pressures.

To solve the problem posed, the invention is characterized by the fact that the two die heads are guided through at least one retaining slot that extends in a radial direction, and is constituted as part of the receiving slots of the tool head. This is accomplished by the invention by arranging the die heads to be guided movably in the receiving slots of the tool head by way of an additional retaining slot extending in a radial direction. This additional guide has the advantage that the die heads or knives resist even high cutting pressures, particularly when they have been moved out of or extended from the tool head radially, as far as possible.

It is accordingly an object of the invention to obtain improved guidance of the die heads. Such improvement results in the fact that, when using the relative dimensions of a cutting head, as described in the above-noted patents, it is possible, by means of the present invention, to make use of die heads that can be moved out of the tool head radially much farther than before. By means of the particular guide taught by the invention, it is possible, e.g., to move the die heads or knives out of the tool head from a minimal diameter of 32 mm up to a maximum diameter of 70 mm, and to resist high cutting pressures when using the counterbore of this invention.

In accordance with another object of the invention, it is preferred that the retaining slot for the cutting head be formed as a V-groove and to have it consist of a rib that cuts or intersects the central longitudinal axis of the counterbore or tool head symmetrically, having an approximately triangular profile, and interacting with wedge faces of the die heads.

The forces of the cutting pressure, which act largely in a peripheral direction, are transmitted optimally, by the structure of the present invention, from wedge surfaces of the die heads to the coacting wedge surfaces of the V-shaped groove and, thereby guide the tool head, without causing any undue bending, or even breaking, of the die heads or of their support.

It is, however, important that the cutting or die heads also lie against one another in a certain central area, viz., even when the cutting heads are moved outwardly to their maximal outward position in the tool head. This central area of lying against one another is called the "overlap area."

The cutting forces that act in a peripheral direction will not only be absorbed by way of the walls of the take-up slots and the wedge areas of the V-shaped groove, but, also due to the "overlap area," lying against one another of the cutting heads. By this feature of the invention, the cutting pressure of one cutting head is transmitted directly to the other cutting head which receives the cutting pressure in the opposite direction, so that the cutting pressures in the "overlap area" actually cancel each other out and that, in consequence thereof, the guide means for the cutting heads in the tool head may have relatively small dimensions.

It is a further object of the invention to provide other forms of embodiment of the invention. In one form, instead of the V-shaped groove, either a T-shaped groove or a dovetail-shaped groove is used. This means that all imaginable forms of the groove are possible, on the condition that the groove guide ensures a moving guidance of the dies or knives in a radial direction. Instead of the use of a single guide groove, it is possible also to mount two or more parallel grooves, and it is also provided that its own groove can be assigned to or associated with each cutting die or head, when one groove is not being connected with the other opposite groove of the other cutting die or head. For reasons of more efficient production, it is preferred, however, that the V-shaped groove intersects the central longitudinal axis of the tool head, and that one wedge surface of the V-shaped groove is associated with one cutting die or head, while the other wedge surface is associated with the other cutting die or head.

Other and further objects will be apparent from the following detailed description of a preferred embodiment when taken with the drawings.

The level of invention of the present invention results not only from the objects as stated and claimed, but also from a combination thereof. All data and characteristics disclosed, in particular the spatial design as shown in the drawings, are considered as essential to the invention, inasmuch as these features are, singly or in combination, new in relation to the state of the art.

BRIEF DESCRIPTION OF THE VIEWS OF THE DRAWING

In the following detailed description, the invention is discussed on the basis of drawings that show a preferred embodiment of the invention. Additional characteristics and advantages of the invention follow from the drawings and from their description. In the drawing.

DETAILED DESCRIPTION OF PREFERRED EMBODIMENT

As the disclosure of the structure and function of the inventive counterbore is an improvement to the counterbore disclosed in the two patents mentioned at the outset, and in which the function of the radial displacement of the cutting dies or heads 2, 3 which rest in the tool head 1 which may be moved radially, is described, the following description will be confined to the aspects of the improvement.

Figure 1:
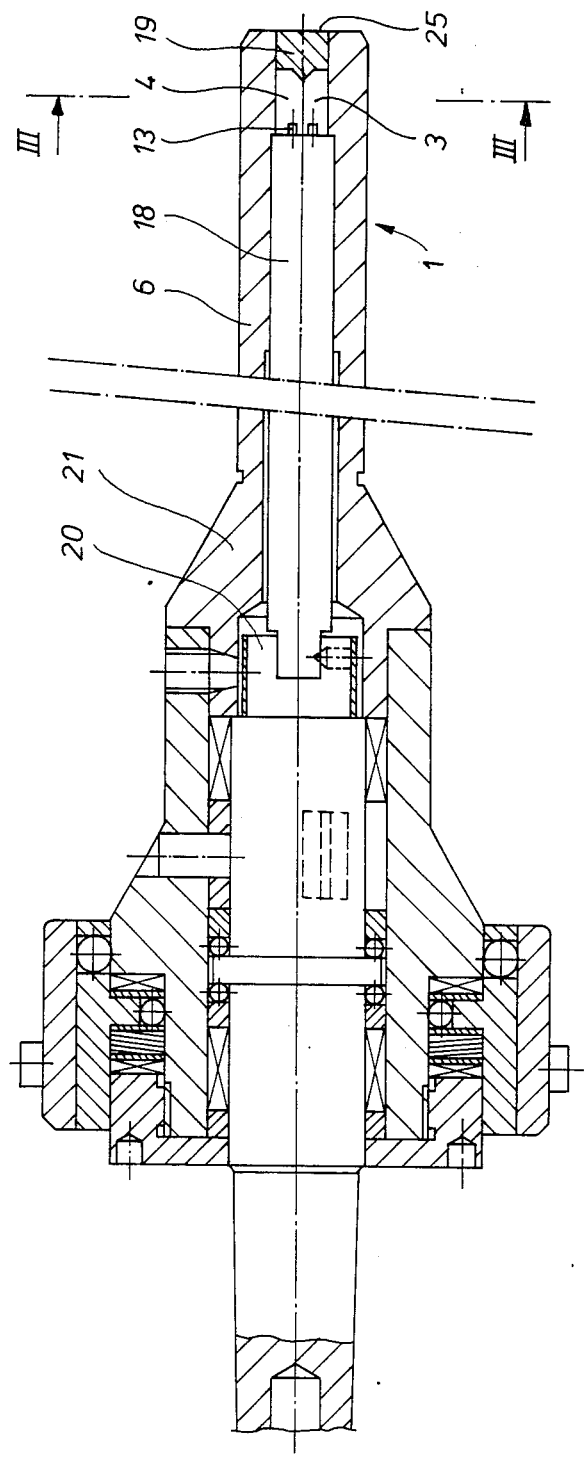
FIG. 1 is a schematic longitudinal section through a counterbore in accordance with the invention.
Figure 2:
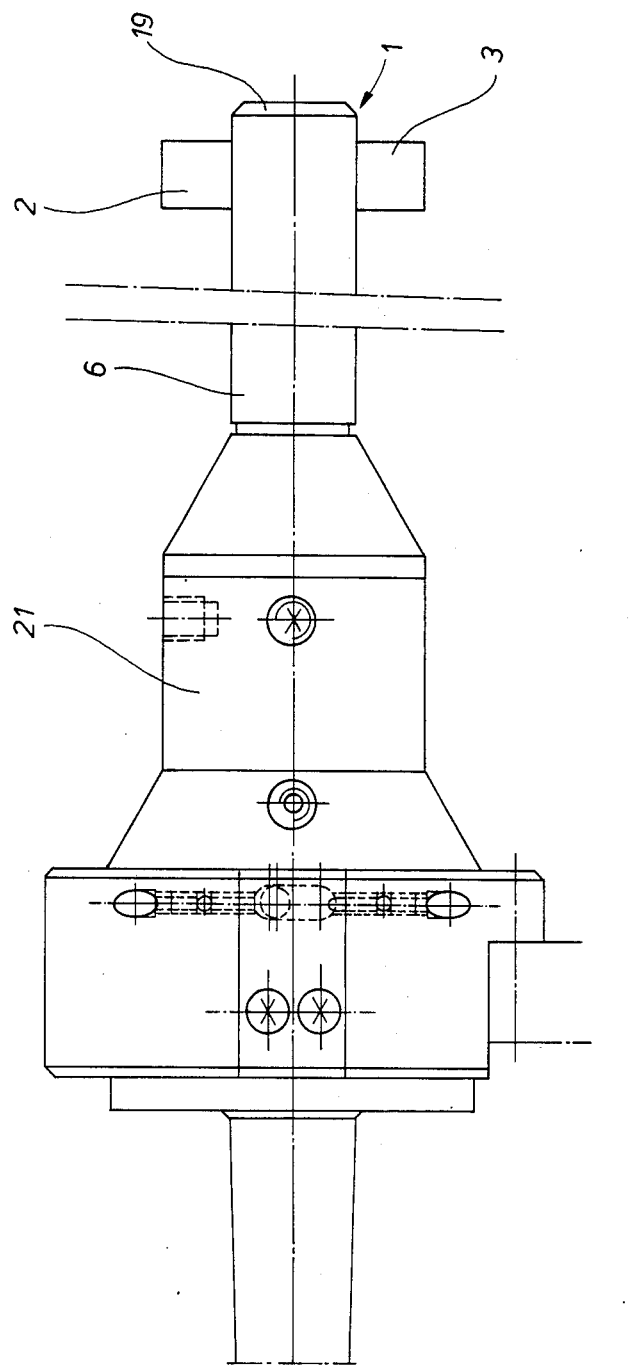
FIG. 2 is a top-view of the counterbore in accordance with FIG. 1.
Figure 3:
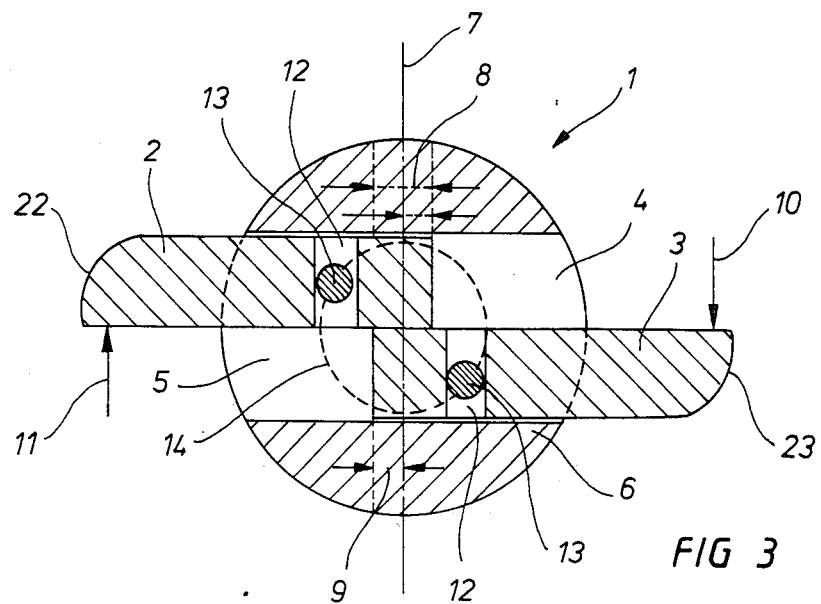
FIG. 3 is a section of the tool head taken along line III—III of FIG. 1.

In accordance with FIGS. 1 and 3, the cutting dies or heads are moved by a counterpoise 18 that has been developed as a rod which is received in or resting in the cutter casing 6. The mounting is known with one end of counterpoise 18 connected in a torsion-resistant manner with a torsion box 20, by means of which it is possible to execute the torsion or rotation of the counterpoise 18 in the direction of the periphery within a dial sector that has been determined and limited precisely. Two spaced pins 13, arranged at a preselected distance, are mounted eccentrically on the front end of the counterpoise 18; they engage pertinent transverse slots 12 of the cutting dies or heads 2, 3. When the counterpoise 18 is rotated, the pins 13 move within the area of the circular path 14 and, because of their eccentric mounting in relation to the axis of rotation (central longitudinal axis 24), the cutting heads 2, 3 are moved radially out of or into the tool head 1.

Figure 4:
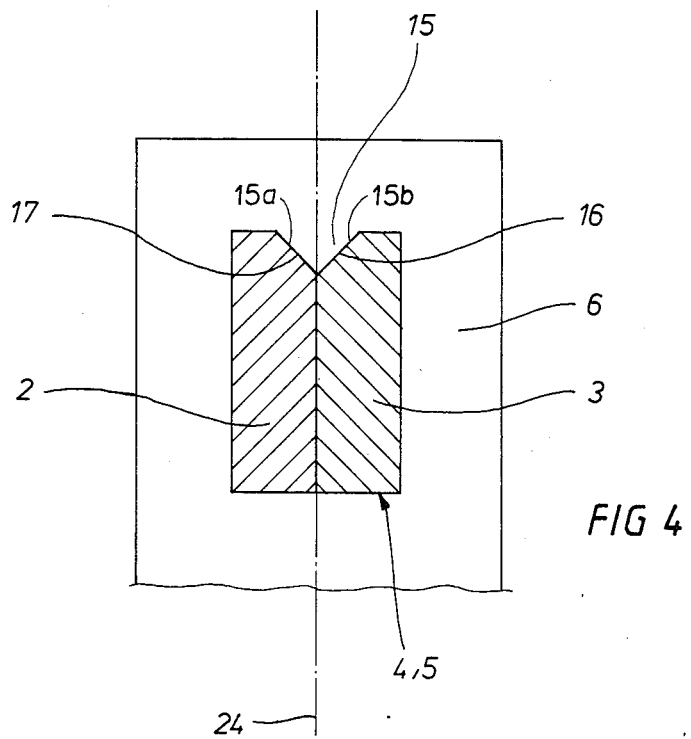
FIG. 4 is a schematic lateral view of the tool head showing the take-up slots and the cutting dies or heads resting or received therein.

In accordance with FIGS. 3 and 4, the cutting heads 2, 3 are mounted in two neighboring take-up slots 4, 5 that are placed next to one another and open or converge into one; FIG. 3 presents a top-view of the two neighboring take-up slots 4, 5, while FIG. 4 presents a frontal view of said take-up slots.

In the embodiment of the invention in accordance with FIG. 3, the cutting pressure acts in the direction of arrows 10, 11, i.e., in the peripheral direction on the cutting heads 2 and 3 which are respectively provided with an outward-pointing cutting edge 22 and 23. Inasmuch as the arrows 10, 11 run or point in opposite directions in relation to the central longitudinal axis 24, the cutting pressure is absorbed largely within the overlap area 8 of the two cutting heads 2, 3, the insides of which lie against one another within the area of the take-up slots 4, 5, even when they are moved outward as far as possible. This position is illustrated in FIG. 3. The rear end—which is located in the take-up slots 4, 5—of each cutting head is extended, therefore, beyond the center line 7 by a distance 9, so that the aforementioned overlap area 8 will result.

In addition, it is important that the pins 13 of the counterpoise 18 are mounted with play in the transverse slots 12 of the cutting heads 2, 3, so that the pins themselves do not play any part in transmitting the cutting forces.

FIG. 4 shows a V-shaped groove that consists of a V-shaped rib 15 that—in the example of the embodiment of the invention in accordance with FIG. 1—is attached to or formed integral with the underside of cover 19, which is glued or screwed or otherwise fixed into the central recess 25 on the end or front side of the tool head 1. The rib 15 forms lateral wedge surfaces 15a and 15b that interact with associated wedge surfaces 16, 17 formed on the cutting heads 2, 3. The respective wedge surfaces lie against one another. Thereby, the cutting forces that are transmitted from the cutting heads 2, 3 to the wedge surfaces 16, 17 are split and divided into varying force components which consequently can be passed on into the material of the tool head 1 more easily.

As shown, the tool head 1 is part of the entire tool body 21 (FIG. 1). But, it may also be designed as a part detachably separable from the tool body 21.

Although the invention has been shown and described with respect to a preferred embodiment, nevertheless, changes and modifications are possible which do not depart from the spirit of the invention. Such are deemed to fall within the scope of the appended claims.

What is claimed is:

1. Counterbore for the bilateral mounting of plane surfaces on through holes comprising a tool head, means for driving the tool head rotationally, two cutting heads having cutting edges, the tool head defining take-up slot means within which the cutting heads are received with the cutting edges pointing in opposite directions, the cutting heads being received in the take-up slot means in such a way that they may be selectively moved radially and fixed in the tool head, and lie against one another within the area of the take-up slot means, at least one radially extending guide means located in the take-up slot means of the tool head for guiding the two cutting heads and for assisting in the transmission of cutting forces from the cutting heads into the tool head wherein the guide means includes a rib extending inwardly from a wall of the slot means, the rib intersecting a central longitudinal axis of the tool head symmetrically and interacting with respective surfaces on each of the cutting heads.

2. Counter bore in accordance with claim 1, wherein the rib has a profile which is approximately triangular, said rib interacting with wedge surfaces defined on the cutting heads.

3. Counterbore in accordance with claim 1, wherein the guide means is a V-shaped groove.

4. Counterbore in accordance with claim 1, wherein the guide means is a rib and groove with inclined surfaces.

5. Counterbore in accordance with claim 1, wherein the cutting heads lie against one another in an overlap area in the center of the tool head even when moved out radially.

6. Counterbore for the bilateral mounting of plane surfaces on through holes comprising a tool head, means for driving the tool head rotationally, two cutting heads having cutting edges, the tool head defining take-up slots means within which the cutting heads are received with the cutting edges pointing in opposite directions, the cutting heads being received in the take-up slot means in such a way that they may be selectively moved radially and fixed in the tool head, and lie against one another within the area of the take-up slot means, at least one radially extending guide means located in the take-up slot means of the tool head for guiding the two cutting heads and for assisting in the transmission of cutting forces from the cutting heads into the tool head wherein the guide means is formed in part by the underside of a closure mounted in a recess formed in the end of the tool head.

7. Counterbore in accordance with claim 6, wherein the closure is fixed in the recess of the tool head.

8. Counterbore in accordance with claim 1, wherein the guide means is formed in part by the underside of a closure mounted in a recess formed in the end of the tool head.

9. Counterbore in accordance with claim 8, wherein the closure is fixed in the recess of the tool head.

* * * * *